UNITED STATES PATENT OFFICE.

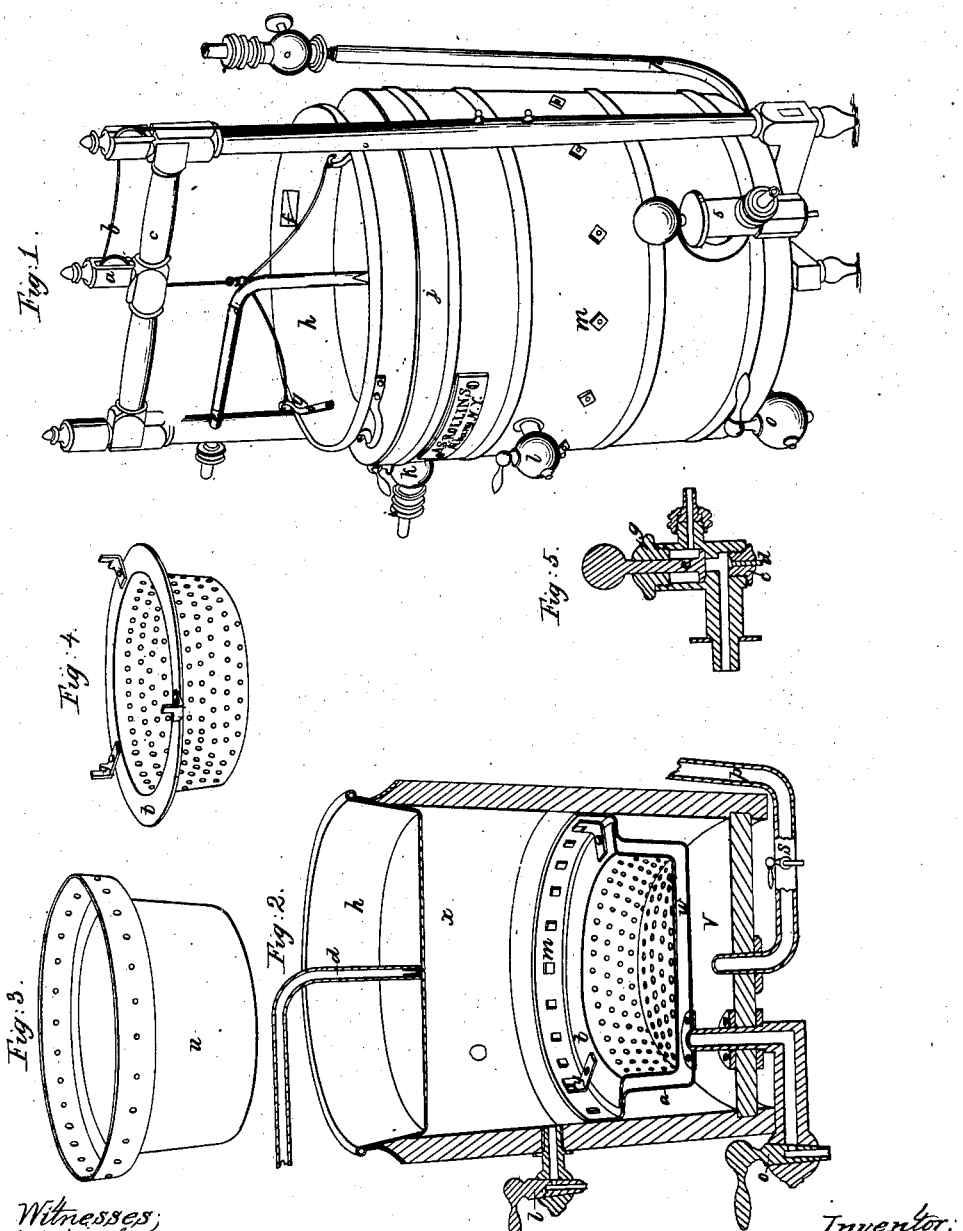

ARCHELAUS S. ROLLINS, OF ALBANY, NEW YORK.

PREPARING HOP LIQUOR FOR DISTILLERS AND BREWERS.

Specification of Letters Patent No. 23,266, dated March 15, 1859.

*To all whom it may concern:*

Be it known that I, ARCHELAUS S. ROLLINS, of Albany, in the county of Albany and State of New York, have invented a new and useful Process of Boiling Hops for the Uses of Distilling and Brewing; and I hereby declare the following to be a full and exact description of its nature and operation, reference being had to the accompanying drawings, making part of this specification.

The said process consists in boiling or steeping hops within a closed vessel and condensing the vapors evolved so as to prevent such pressure from the interior as to cause the escape of volatile matters.

In the accompanying drawings:—Figure 1 is a perspective view of an apparatus illustrating my invention. Fig. 2 is an axial section of the same. Fig. 3 is a perspective view of the inside boiling copper detached. Fig. 4 is a similar view of the "strainer." Fig. 5 is an axial section of a combined safety and vacuum valve.

$j$ is an outer shell having a boiling copper $u$ attached concentrically within it so as to leave a close steam space $v$, beneath and around the said boiler.

$t$ is a "strainer" for separating and containing the hops when the infusion is drawn off as hereinafter explained.

$p$ is a pipe which discharges steam into the space $v$ beneath the boiler.

$q$ is a stopcock in the pipe $p$.

$o$ is a discharge pipe communicating with the boiler $u$ and fitted with a stopcock $o'$.

$l$ is a gage cock to indicate the height of water within the boiler.

$h$, is the condenser consisting in the present illustration of a shallow pan into the center of the bottom of which a continuous stream of cold water is discharged from a pipe $d$, slotted at its end.

$f$ is a spout through which warm water flows from the pan $h$. The said pan may be elevated by means of cords or chains $b$, passing over sheaves $a$;—the pipe $d$ being previously removed.

$k$, is a cock through which water is supplied to the interior of the boiler.

$s$ is a drip cock to allow the escape of water of condensation from the chamber $v$ and pipe $p$.

5 (Fig. 1) is a combined safety and vacuum valve which is represented by a detached axial section in Fig. 5—in which $c$ is the safety valve and $d$ the vacuum valve.

The operation is as follows:—The pan $h$ being elevated, and other parts in the position seen in Fig. 2, water is drawn in through the cock $k$ until it rises within the boiler to the gage cock $l$. The requisite quantity of hops is then added and stirred into the water, and the pan $h$, lowered so as to close the top of the boiler. Steam at a pressure of from one to three pounds is then admitted through the pipe $p$, into the space $v$, beneath the boiler so as to heat the water within the boiler. A continuous stream of cold water is now let on through the pipe $d$, coming in contact with the bottom of the pan $h$, so as to keep the latter at a low temperature. At the same time the steam from the contents of the boiler $u$ rises into the upper space $x$ of the same and coming in contact with the bottom of the pan $h$, is thereby condensed, the effect of which is to prevent any pressure within the boiler and consequent escape of steam or volatile matters from the hops. As the water within the pan $h$ becomes heated by contact with the bottom of the same it rises to the top and any superfluity escapes through the spout $f$. When the hops are sufficiently boiled or steeped the infusion is drawn off through the pipe $o$. The pipe $d$, is then removed, the pan $h$ elevated, the strainer $t$ with its contained hops taken out and the latter discharged.

It will be observed that no connection exists between the steam chamber $v$ and the interior of the boiler and that the latter is entirely closed against any communication with the contents of the pan $h$, or with the external air; the space between $u$ and $x$ being a closed chamber within which pressure is prevented by condensation as explained.

It is well known that when steam is allowed to escape during the boiling of hops a large part of their most essential qualities to produce fermentation is lost by evaporation, which necessitates the use of a wasteful quantity of hops and results in the production of an infusion inferior in quality and uncertain both in strength and volume. By my simple apparatus I am enabled to prevent the escape of any vapor whatever thus avoiding waste and producing an infusion of superior quality, the volume and strength of which are accurately determined by the quantity of water and hops used. The invention is also equally applicable to the boiling of hops in worts as is customary in brewing.

My invention is not confined to any particular form of boiling apparatus and it will also be evident that the condensing department is susceptible of various modifications without changing its essential characteristics:—for instance the vapor from within the boiler may be passed into a worm or a separate vessel prepared for its condensation. I do not therefore desire to be understood as limiting myself to the precise arrangement and details here laid down but

I claim as new and of my invention and desire to secure by Letters Patent—

The preparation of hop liquor for the purposes of distilling and brewing by the process set forth.

In testimony of which invention, I hereunto set my hand.

A. S. ROLLINS.

Witnesses:
  OCTS. KNIGHT,
  EDM. F. BROWN.